Aug. 26, 1969          O. A. YOST          3,463,193
SLIDE VALVE CONSTRUCTION
Filed Dec. 1, 1966                6 Sheets-Sheet 2
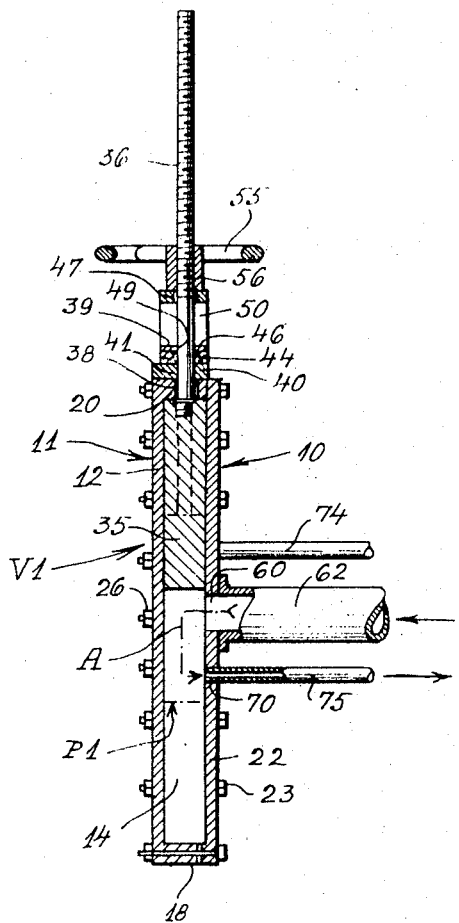
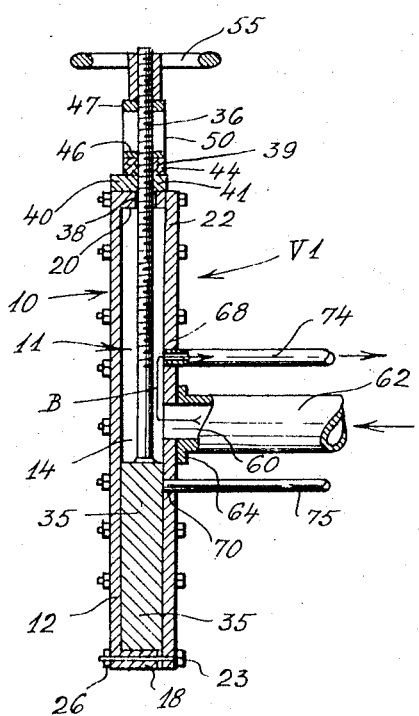
INVENTOR
Oscar A. Yost
BY Polachek & Saulsbury
ATTORNEYS

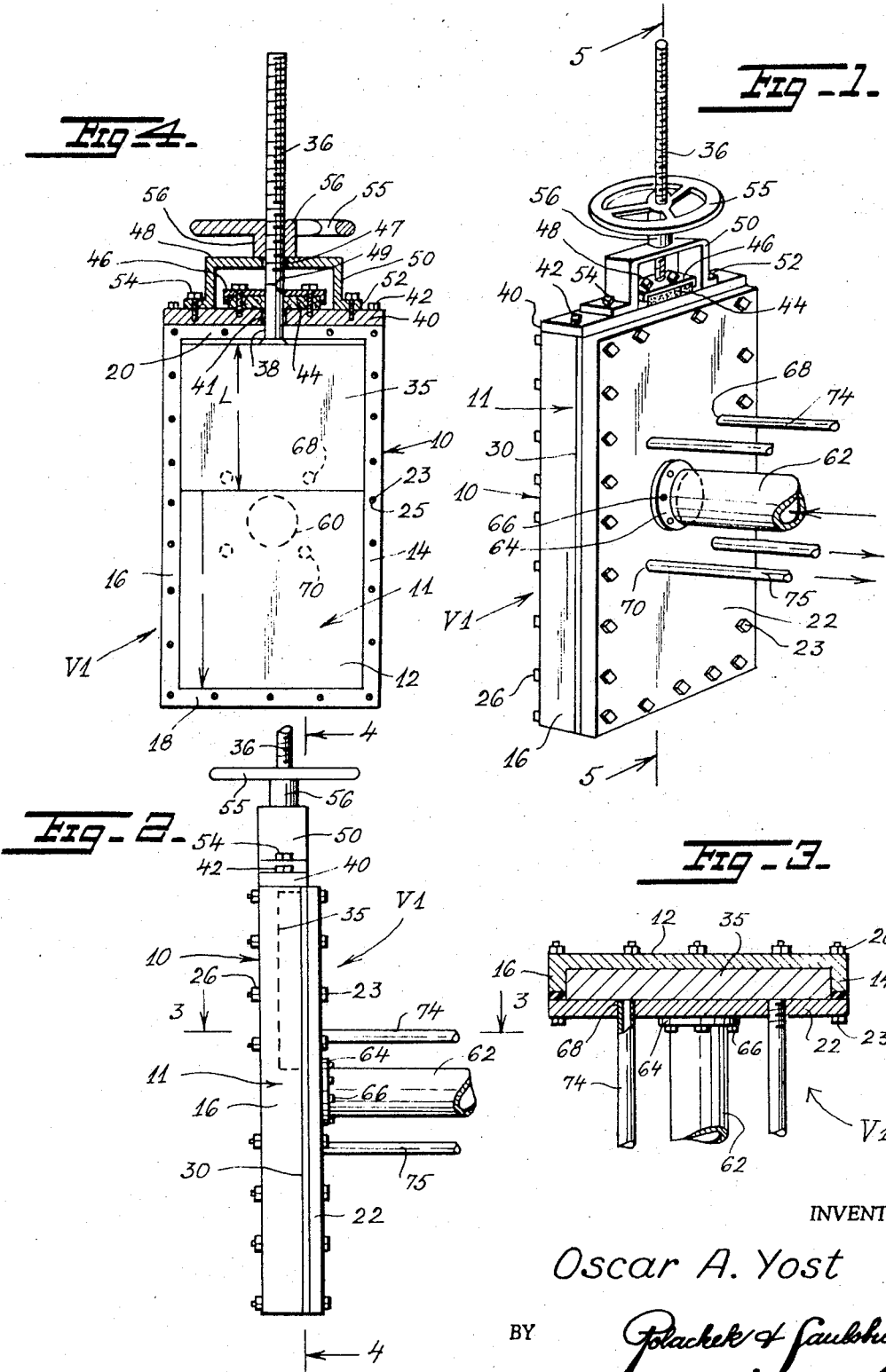

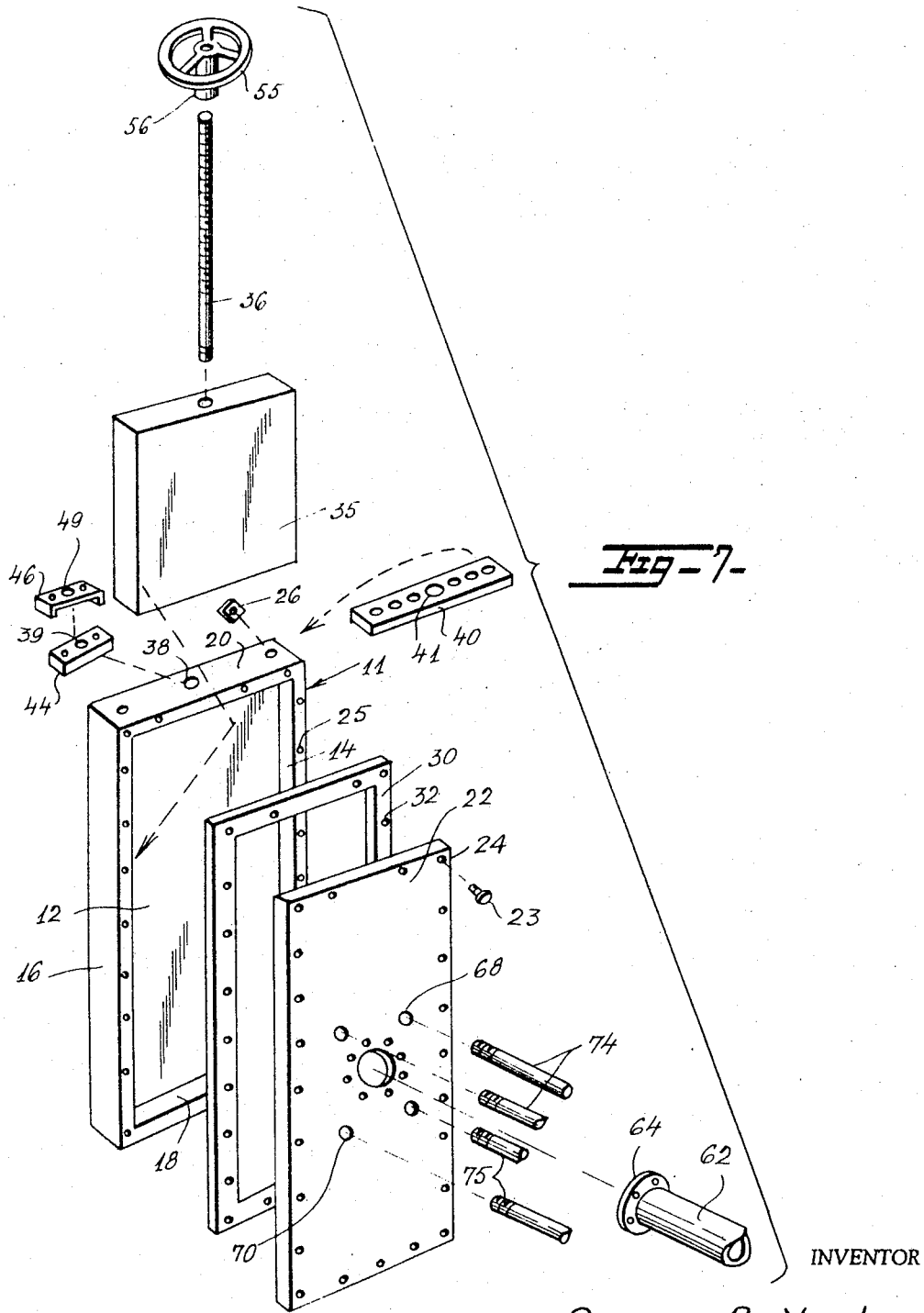

Aug. 26, 1969     O. A. YOST     3,463,193
SLIDE VALVE CONSTRUCTION
Filed Dec. 1, 1966     6 Sheets-Sheet 4
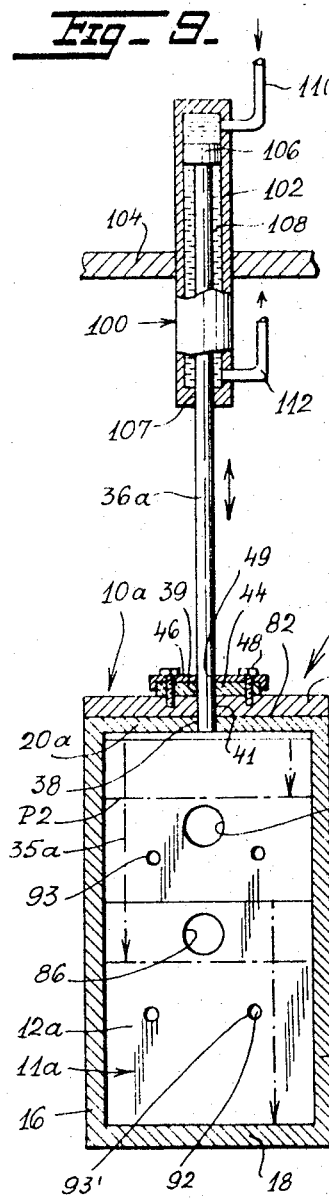
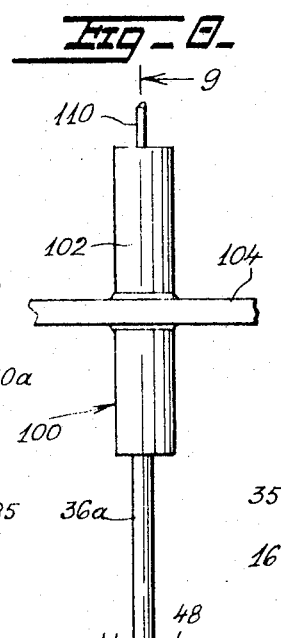
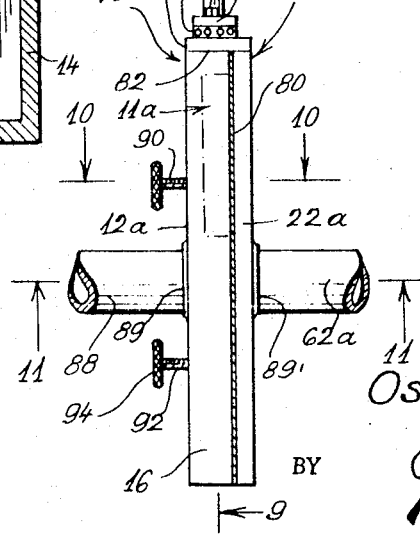
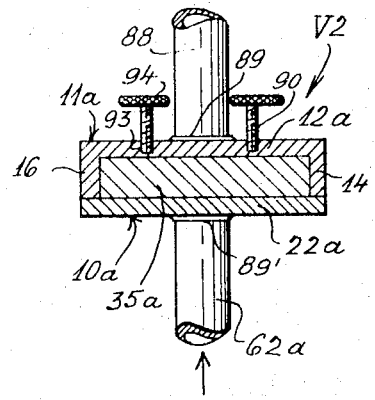
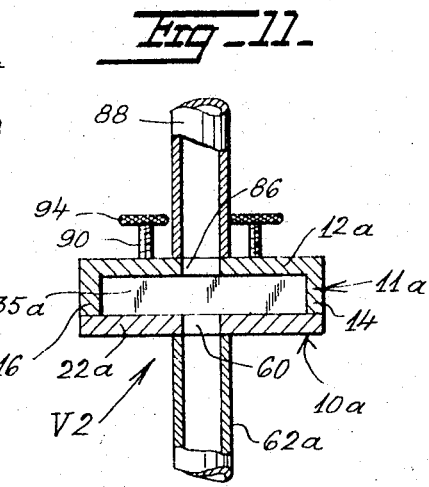
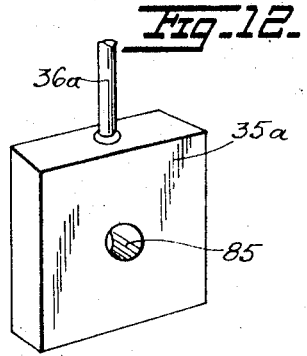
INVENTOR
Oscar A. Yost
BY Polachek & Saulsbury
ATTORNEYS Aug. 26, 1969     O. A. YOST     3,463,193
SLIDE VALVE CONSTRUCTION
Filed Dec. 1, 1966     6 Sheets-Sheet 5
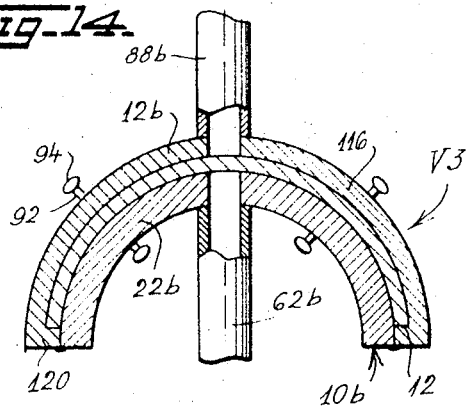
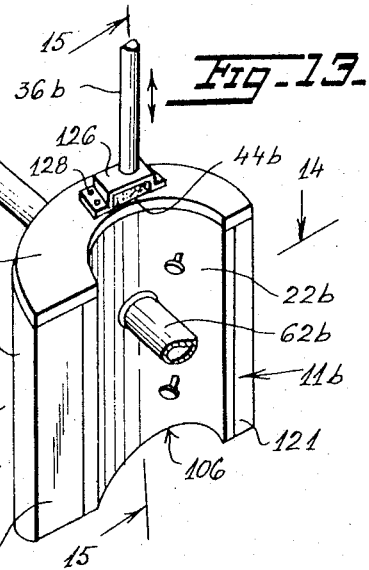
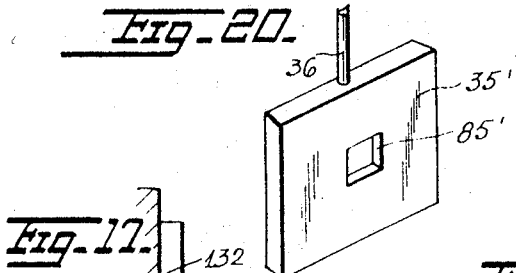
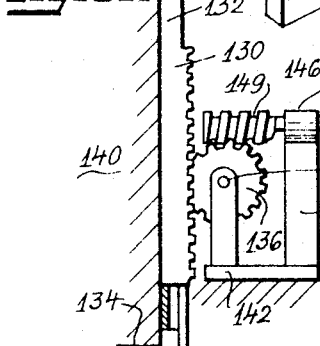
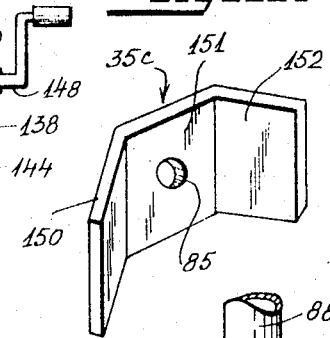
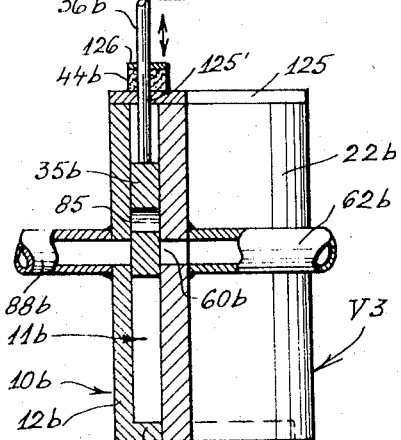
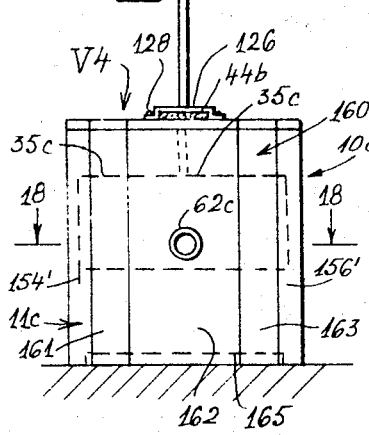
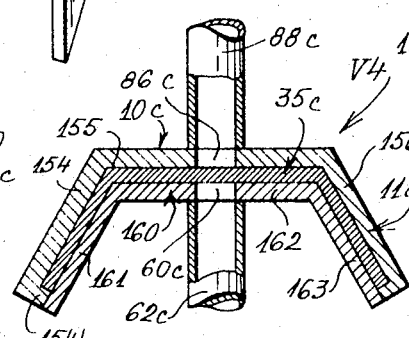
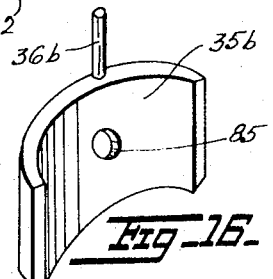
INVENTOR
Oscar A. Yost
BY
Polachek & Saulsbury
ATTORNEYS

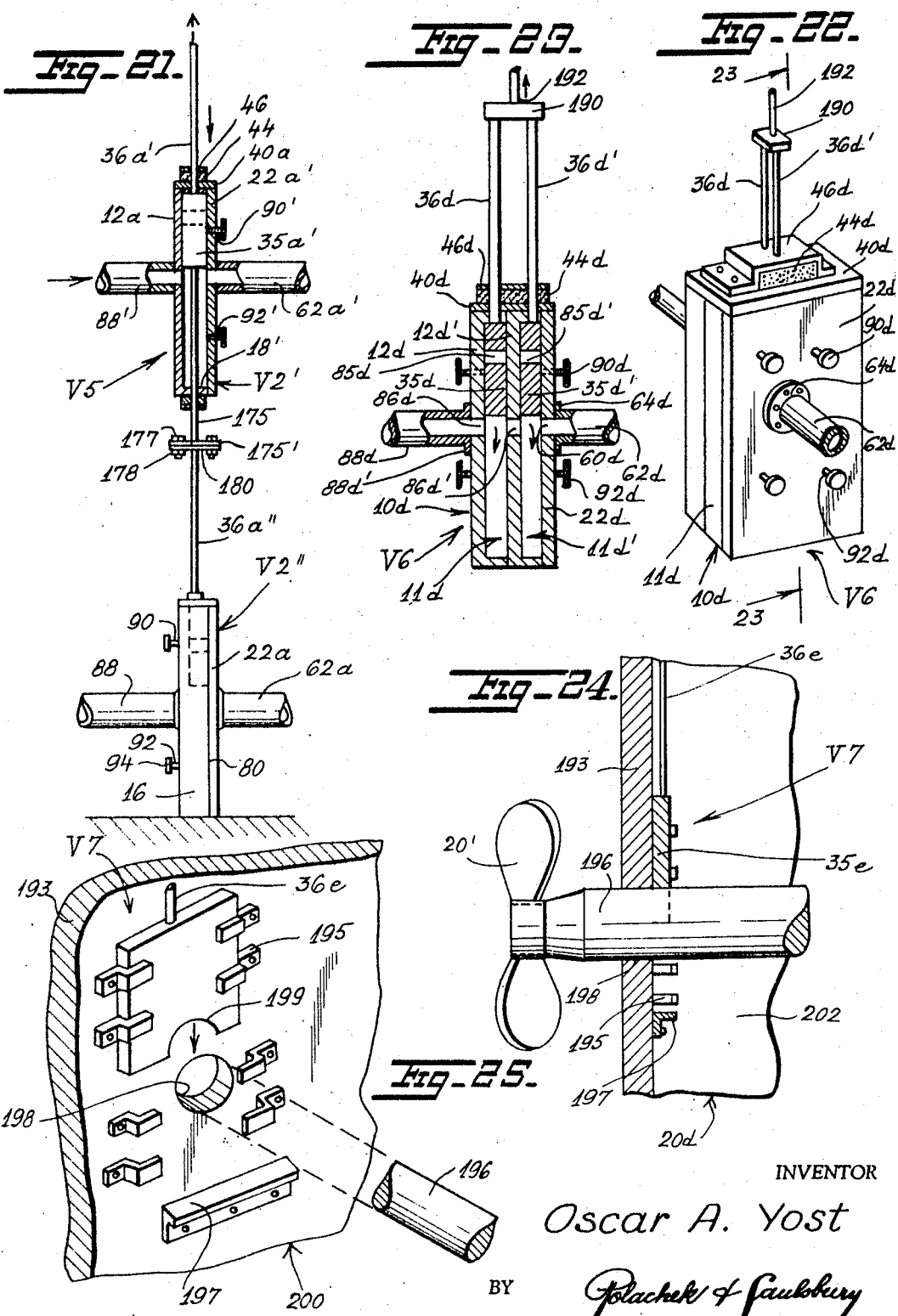

United States Patent Office 3,463,193
Patented Aug. 26, 1969

3,463,193
SLIDE VALVE CONSTRUCTION
Oscar A. Yost, 302 W. 22nd St., New York, N.Y. 10011
Filed Dec. 1, 1966, Ser. No. 598,483
Int. Cl. F16k *3/02, 31/50*
U.S. Cl. 137—625.42        1 Claim

ABSTRACT OF THE DISCLOSURE

The disclosure describes a slide valve construction in which a valve plate is slidable to open and close an opening in a casing wall. The casing can be made of plates bolted or welded together.

This invention relates to the art of slide valves and more particularly concerns a flat or curved valve plate slidable along a flat or curve casing wall for selectively closing or clearing an opening in the wall.

A particularly important feature of the invention is the assembly of the valve housing or casing from flat or curved plates. Thus no casting of parts is necessary as in conventional valves. All parts can be made of the same type of metal so as to eliminate corrosive electrolysis between parts. The valves can easily be taken apart for inspection and repairs and quickly reassembled.

It is therefore a principal object of the invention to provide a valve construction in which a flat or curved plate is slidable in a casing.

Another object is to provide a valve construction as described, wherein openings are at opposite sides of the valve casing, or in one side of the casing, with the valve plate serving to clear or close the openings.

Still another object is to provide a valve construction as described, in which a plurality of valve assemblies having similar construction are coupled together for simultaneous operation.

Another object is to provide a valve construction adaptable for sealing a shaft opening in a hull of a ship.

For further comprehension of the invention and of the objects and advantages thereof, reference will be had to the following description and accompanying drawings and to the appended claim in which the various novel features of the invention are more particularly set forth.

In the accompanying drawings forming a material part of this disclosure:

FIGURE 1 is a perspective view of a first valve assembly embodying the invention.

FIG. 2 is a side elevational view of the valve assembly of FIG. 1.

FIG. 3 is a cross sectional view taken on line 3—3 of FIG. 2.

FIG. 4 is a vertical sectional view taken on line 4—4 of FIG. 2.

FIG. 5 is a vertical sectional view taken on line 5—5 of FIG. 1, showing the valve plate in one position.

FIG. 6 is a sectional view similar to FIG. 5 showing the valve plate in another position.

FIG. 7 is an exploded perspective view of parts of the assembly of FIG. 1.

FIG. 8 is a side elevational view similar to FIG. 2 of a second valve assembly.

FIG. 9 is a vertical sectional view taken on line 9—9 of FIG. 8.

FIG. 10 is a cross sectional view taken on line 10—10 of FIG. 8.

FIG. 11 is a cross sectional view taken on line 11—11 of FIG. 8.

FIG. 12 is a perspective view of the valve plate employed in the second valve assembly.

FIG. 13 is a perspective view of a third valve assembly according to the invention.

FIGS. 14 and 15 are horizontal and vertical sectional views taken on lines 14—14 and 15—15 respectively of FIG. 13.

FIG. 16 is a perspective view of the valve plate employed in the third valve assembly.

FIG. 17 is a front elevational view of a fourth valve assembly.

FIG. 18 is a cross sectional view taken on line 18—18 of FIG. 17.

FIG. 19 is a perspective view of the valve plate employed in the fourth valve assembly.

FIG. 20 is a perspective view of another valve plate construction.

FIG. 21 is a side view partially in vertical section of a fifth valve assembly.

FIG. 22 is a perspective view of a sixth valve assembly.

FIG. 23 is a vertical sectional view taken on line 23—23 of FIG. 22.

FIG. 24 is a fragmentary vertical sectional view of a seventh valve assembly.

FIG. 25 is a perspective view of the seventh valve assembly.

Referring first to FIGS. 1–7, there is shown a first valve assembly V1, including a rectangular casing 10 which has a shallow box-like back 11 formed with a flat rectangular back wall 12, narrow opposing vertical side walls 14, 16, a narrow horizontal bottom wall 18 and narrow horizontal top wall 20. The casing has a rectangular front wall 22. Bolts 23 extend through holes 24, in the margins of the front wall 22 and through holes 25 in the top, bottom and side walls of the casing back 11. These bolts extend out through the back wall 12 and are secured by nuts 26. A rectangular gasket 30 is interposed between margins of the front wall and forward edges of the casing back 11. The bolts extend through holes 32 in this sealing gasket.

A flat rectangular valve plate 35 is slidably disposed inside the casing. The plate 35 moves vertically. Secured to the upper end of plate 35 is an axially vertical shaft 36. This shaft extends through a hole 38 in top wall 20. A cross plate 40 is secured by bolts 42 to the top of the casing. On this cross plate is a fibrous block 44 which serves as a sealing packing block for the movable shaft 36 which extends through holes 39, 41 in the block plate. A pressure and anchor plate 46 overlays the block 44 and bolts 48 secure the plate 46 and block 44 to the cross plate 40. Shaft 36 goes through hole 49 in plate 46.

The upper portion of shaft 36 is threaded. This part of the shaft extends through a hole 47 in an inverted rectangular U-shaped bearing bar or plate 50. Flanges 52 of plate 50 are secured by bolts 54 to the cross plate 40. A hand wheel 55 is provided with an axially threaded hub 56 and is screwed on the threaded part of shaft 36. When the wheel is turned, the hub bears on bearing plate 50 and moves shaft 36 vertically up or down depending on the direction in which the wheel is turned. The bottom end of the shaft is welded to the top of the plate 35 or otherwise so secured that it is not rotatable with respect to plate 35. Thus turning the wheel 55 elevates or lowers the valve plate 35 in the casing 10.

The front wall 22 of the casing is provided with an opening 60 about midway between its upper and lower ends. A pipe 62 is axially aligned with opening 60. The pipe has an annular flange 64 secured by bolts 66 to the front of wall 22. At least one small hole 68 is provided above opening 60 and at least one other hole 70 is provided below opening 60. Actually two holes 68 and two holes 70 are shown provided in front wall 22. Pipes 74, 75 are secured in holes 68, 60 respectively. The valve plate 35 has a length L which is slightly less than the distances from the top and bottom edges of opening 60 to the top and bottom walls 20 and 18 respectively of the casing.

When plate 35 is in the uppermost position shown in FIGS. 4 and 5, free passages exist between pipe 62 and pipes 75 through the casing 10 as shown by arrow A in FIG. 5, while plate 35 closes off pipes 74. When the plate 35 is in the lowermost position shown in FIG. 6, free passages exist between pipe 62 and pipes 74 through the casing as shown by arrow B, while plate 35 closes off pipes 75. The plate 35 can be lowered to dotted line position P1 indicated in FIG. 5 in which all pipes will be closed off from the interior of the casing and from each other.

As shown in FIG. 7 all parts of the valve assembly can be easily taken apart by removing the bolts and nuts holding the parts together. Thus inspection and replacement or repair of any part can be easily accomplished. The valve plate 35 fits snugly in the casing 10 to provide a good hermetic seal so that fluid entering from pipe 62 will be effectively blocked off from the casing or from the closed off pipes or holes. Assembly of the valve requires no complicated expensive machining operations. Relatively simple tools such as a screw driver and wrench serve for assembling the parts together.

In FIGS. 8–12 is shown another valve assembly V2 which is generally similar to valve assembly V1. Corresponding parts are identically numbered. Valve assembly V2 has a casing 10a which includes a shallow box-like back 11a and a front wall 22a. The front wall is integrally secured to the back 11a by welding 80. Cross plate 40a is secured by welding 82 to the top of the casing. On plate 40a is packing block 44 held by anchor plate 46 and bolts 48. Shaft 36a extends vertically through hole 38 in top wall 20a of the casing, and through holes 39, 41, 49 of block 44, plate 40a and plate 46 respectively.

The shaft 36a is secured at its lower end to valve plate 35a which has a centrally located hole 85 equal in size to opening 60 in front wall 22a; see FIGS. 9 and 12. A hole 86 is provided in back wall 12a aligned with opening 60. Pipe 88 is secured by welding 89 to the outside of wall 12a at hole 86 and is axially aligned with pipe 62a secured by welding 89' at opening 60. Two pairs of locking bolts 90 and 92 are provided on the back wall above and below hole 86. These bolts extend through holes 93, 93' in wall 12a. Handles 94 on the bolts can be manually turned so that the bolts bear against the movable valve plate 35a to hold it in fixed position inside the casing 10a.

Shaft 36a is moved up and down by means of a hydraulic motor 100. This motor includes an axially vertical stationary cylinder 102 mounted on a support 104. A piston 106 is secured to the upper end of shaft 36a which extends through hole 107 in the bottom of the cylinder. Fluid 108 in the cylinder fills the interior of the cylinder. Conduits 110 and 112 are connected to opposite ends of the cylinder above and below the piston. When the fluid is driven into the cylinder from an external remote supply through conduit 110 the piston moves down. When the fluid is driven into the cylinder from the external fluid supply through conduit 112 the piston moves up. Shaft 36a moves with the piston. When the piston moves up, fluid above the piston leaves the cylinder via conduit 110. When the piston moves down, fluid below the piston leaves the cylinder via conduit 112. By the arrangement described, an operator at a remote operating position can drive the valve plate up or down by driving fluid into the cylinder through either conduit.

When the valve plate is in the elevated position shown in FIG. 9, then a passage is clear through pipes 62a and 88 via the casing 10a. When the valve plate is in an intermediate position P2 indicated by dotted lines then the passage between the pipes is cut off. The valve plate can be lowered to the bottom of the casing to clear the passage. By this arrangement the passage can be sealed by either the upper or lower portions of the valve plate above and below hole 85. Thus the useful life of the valve is considerably lengthened as compared with conventional valves where the entire working area of a valve element is always used to close the valve.

Once the valve plate is in a selected position, partial or fully closing the passage between the pipes 62a, 88 or wholly clearing the passage, the valve plate can be locked in position by turning bolts 90 or 92, depending on whether the valve plate is above or below the holes 60, 86. If the valve plate 35a is centered when closing holes 60, 86 then all bolts 90, 92 can be tightened against the valve plate. This will force the valve plate flat against the inner side of wall 22a and seal the pipe 62a hermetically at opening 60. By this arrangement, even if there is a little side play in the valve plate, this free movement is taken up and the valve plate is locked in hermetic sealing position. When the valve plate 35a is partially or wholly clear of holes 60, 86 then bolts 90, 92 serve to keep the valve plate in the selected position.

Valve assembly V2 like assembly V1 is assembled from stock plate and bars and requires no castings, machining or other expensive metal working processes.

In FIGS. 13–16 is shown another valve assembly V3 which is generally arcuate in cross section. The valve assembly includes a casing 10b having a back section 11b formed with a semicylindrical back wall 12b terminating at narrow diametrally disposed forward walls 120, 121, and narrow arcuate bottom wall 122. Front wall 22b is semicylindrical in form and is welded to forward edges of walls 120, 122. The top of the casing is closed by annular semicircular plate 125 welded to the upper edges of walls 12b, 22b, and 120–122. Valve plate 35b is semicylindrical and slides axially between the walls of the casing. Shaft 36b is joined to the top of the valve plate and extends out of hole 125' in the top of plate 125. The shaft passes through a packing block 44b held on top of plate 125 by anchor plate 126 and bolts 128.

Shaft 36b can be engaged by a hydraulic motor as employed with valve assembly V2, for moving the valve plate up and down. Alternatively the shaft can be raised and lowered by the hand wheel and screw arrangement of valve assembly V1. As a further alternative, the gear mechanism described below in connection with valve assembly V4 can be used.

Valve assembly V4 as shown in FIGS. 17–19 includes a valve plate 35c which has angularly disposed valve sections 150, 151 and 152 each disposed at an angle of about 120° to the adjacent section. The valve plate moves in a correspondingly shaped casing 10c. This casing has a back section 11c provided with three angularly disposed walls 154, 155, 156. Front wall 160 welded to the back casing section 11c, also has three angular disposed flat rectangular sections 161, 162, 163 welded to narrow end walls 154', 156' and bottom wall 165. This angled casing and valve plate structure is stronger than the flat box structure of assemblies V1 and V2, since it resists warping better. The arcuate or semicylindrical structure of valve asembly V3 is also stronger than the flat boxlike casing structures. The semicylindrical structure also has other desirable advantages. If pipe 62b at the center of concave wall 22b is used as a fluid inlet, the curved valve plate 35b will withstand a higher inlet pressure to seal the hole 60b in wall 22b than can be provided by a flat valve plate working against a flat front wall as in valve assemblies V1 and V2. Furthermore if pipe 88b is used as the fluid inlet, the convex wall 12b and curved wall can withstand a higher working pressure than the flat valve plate and flat back wall.

Valve assembly V4 employs a gear mechanism for moving the valve plate 35c up and down. This gear mechanism includes a vertical rack gear 130. This gear is slidably engaged in a vertical channel 132 secured to a vertical support 134. Engaged with the rack gear is a rotatable gear 136 supported on a shaft 138 carried by stationary mounting bracket 140 on a horizontal support 142. Support 142 also carries another bracket 144 on which is a sleeve bearing 146. A crankshaft 148 is journaled in the sleeve bearing and carries worm 149 engaged with the teeth of gear 136. By the arrangement described, when handle 145 of the crank shaft is turned, the rack gear will move up or down raising or lowering the shaft 36b and valve plate 35b. It is of course possible to use the hydraulic motor of valve assembly V2 in place of the mechanism of assembly V3 or vice versa. Pipes 62c and 88c are centered on wall sections 162, 155 in axial alignment. When hole 85 in plate 35c is aligned with holes 60c and 86c the passage is open between pipes 62c and 88c.

FIG. 20 shows a valve plate 35' provided with a rectangular hole 85'. It is possible to employ a rectangular or noncircular hole in the valve plate of any of the valve assemblies described herein.

FIG. 21 shows a mutliple valve structure V5 in which two valve assemblies V2' and V2" each similar to valve assembly V2 can be connected together to be operated simultaneously. Parts corresponding to those of valve assembly V2 are identically numbered. An additional shaft 175 is connected to the underside of upper valve plate 35a' and it extends out of the bottom 18' of the valve casing. The shaft 175 terminates in a flanged plate 175' which is joined by bolts 177 and nuts 178 to flange plate 180 secured to the upper end of lower valve shaft 36a". Thus the upper and lower valve assemblies are coupled together. Upper shaft 36a' can be engaged by any of the valve plate and shaft lifting and lowering mechanisms shown in FIGS. 1, 8 or 17. Bolts 90', 92' are set in front wall 22a' of the upper valve assembly because pipe 88' is used as the inlet and pipe 62a' is the outlet. Other parts are numbered like corresponding parts of valve assembly V2.

In FIGS. 22, 23 is shown a valve assembly V6 which employs two flat valve plates 35d and 35d' working together in a casing 10d. This casing employs two box-like sections 11d and 11d' each similar to casing section 11 of valve assembly V1. The inner casing section 11d' is closed by front wall plate 22d which is welded to the section 11d'. The front edges of casing section 11d are welded to the back 12d' of casing section 11d'. Pipe 62d is joined by a bolted flange 64d to the front wall plate 22d. Pipe 88d aligned with pipe 62d is attached by bolted flange 88d' to back wall 12d of section 11d. Shafts 36d and 36d' are secured to upper ends of valve plates 35d and 35d' and extend through upper cross plate 40d, packing block 44d, and anchor plate 46d. Upper ends of the shafts are connected by a cross bar 190 to which common drive shaft 192 is attached. The two valve plates have aligned holes 85d, 85d' which align with hole 60d in wall 22d, hole 86d' in wall 12d' and hole 86d in wall 12d when the passage through the valve is open. When the valve plates are in the uppermost position shown in FIG. 23 or in a lowered position on bottom walls 18d, 18d' then the passage is also cleared. In an intermediate position of the valve plates the passage is closed. This closure is more effective than is possible with a single valve plate, because any leakage must take place around two valve plates rather than just one as in the other valve assemblies described. Locking bolts 90d and 92d are provided at both sides of the valve casing for locking both valve plates in any selected position.

Valve assembly V7 shown in FIGS. 24 and 25 has a flat valve plate 35e mounted slidably between cleats 195 secured by bolts to a wall which may be a bulkhead or even the hull 193 of a ship 200. An angle bar 197 is secured under the cleats. A shaft 196 extends rotatably through hole 198 in the hull. A semicircular notch 199 at the underside of the plate receives the upper side of the shaft 196. Thus the plate rests on the shaft. If the propeller 201 is removed from the shaft 196 and if the shaft is also removed, then the valve plate 35e can be lowered to close hole 198 and prevent entry of sea water into the after-tank 202 of the ship. Shaft 36e can be engaged with a remotely operated hydraulic motor for raising and lowering the valve plate, when lowered plate 35e rests on bar 197.

In all forms of the invention described, it will be noted that geometrically simple shapes are used for all valve plates, casing walls, shafts, cross plates, etc. This structural arrangement simplifies fabrication methods, minimizes the use of metal working machinery and reduces the need for skilled workmen to assemble the valves. The simplified structure of the valve assemblies insures greater strength; longer useful life; and easier, simpler, quicker and more economical repairs and replacements of valve parts.

What is claimed is:

1. A slide valve construction comprising a movable valve plate, a valve casing having a first wall with a central inlet opening therein with an outlet opening therein above the inlet opening and with an outlet opening below the inlet opening, a shaft attached to one end of said plate for moving said plate in its plane, said plate being disposed in close juxtaposition with said wall and movable to close either outlet opening after first closing said inlet opening and to close both the inlet opening and the outlet openings, and means engaged with said shaft for moving the shaft and plate.

References Cited

UNITED STATES PATENTS

| | | | |
|---|---|---|---|
| 226,715 | 4/1880 | Carter | 137—625.11 |
| 2,820,479 | 1/1958 | Jenkins | 137—625.42 |
| 2,828,767 | 4/1958 | Barusch | 137—625.48 XR |
| 2,997,273 | 8/1961 | Nilsen | 137—625.42 XR |
| 3,027,722 | 4/1962 | Grant | 137—625.42 XR |
| 3,347,269 | 10/1967 | Courneya et al. | 137—625.48 |
| 3,353,557 | 11/1967 | Faisander | 137—625.48 |

JOHN PETRAKES, Primary Examiner

U.S. Cl. X.R.

137—625.11, 625.48; 251—326, 327